Figure 6:
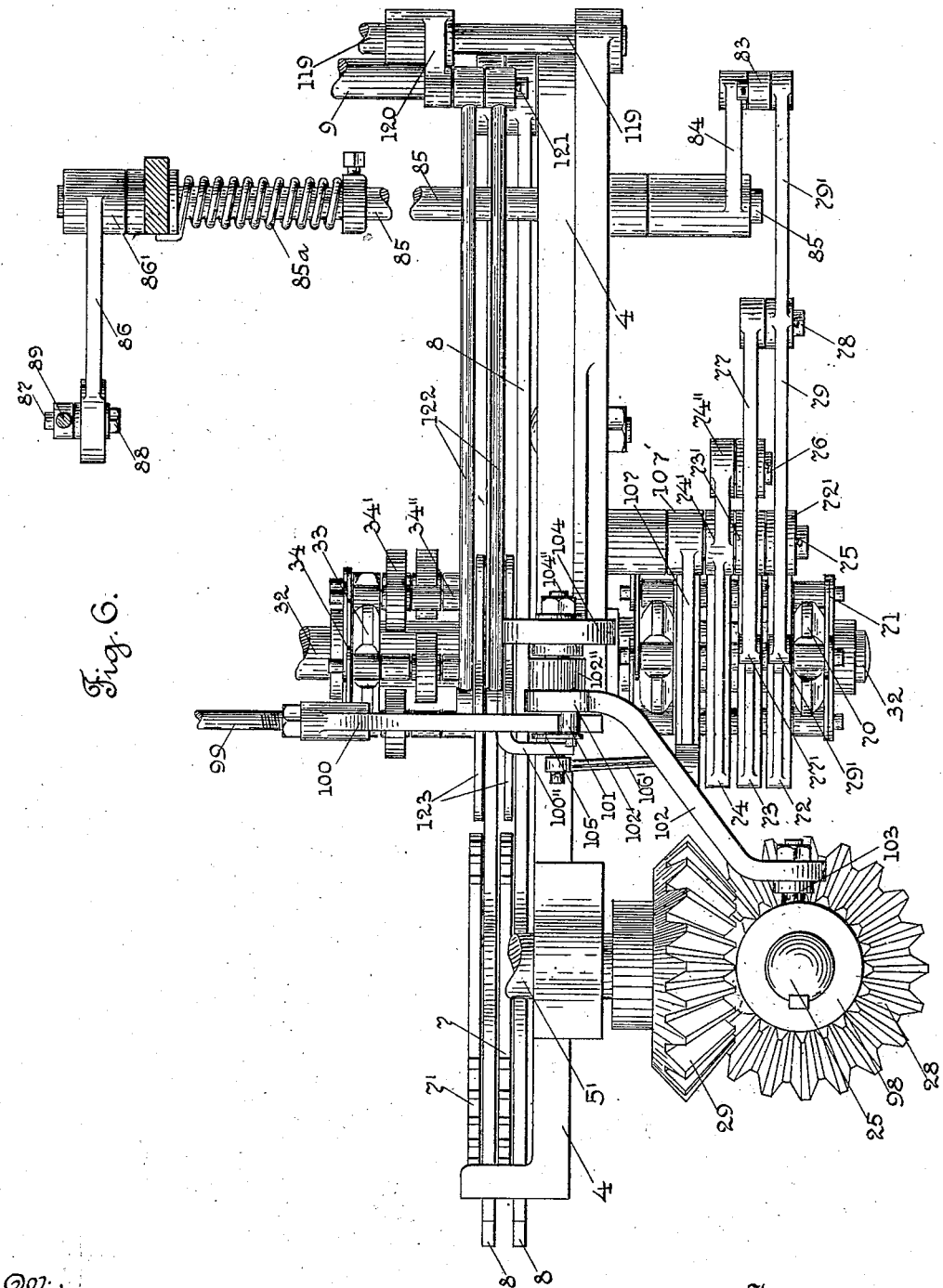

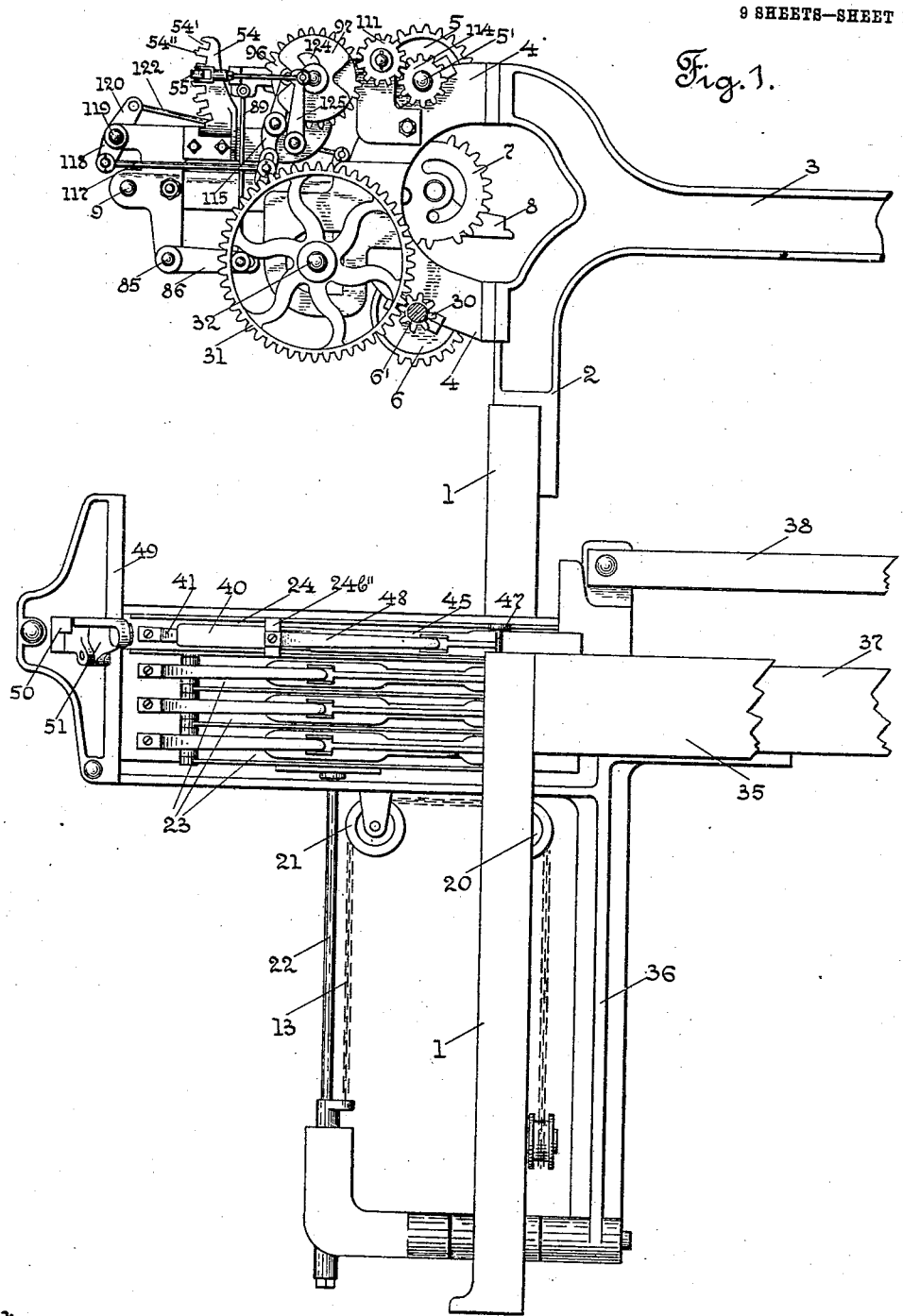

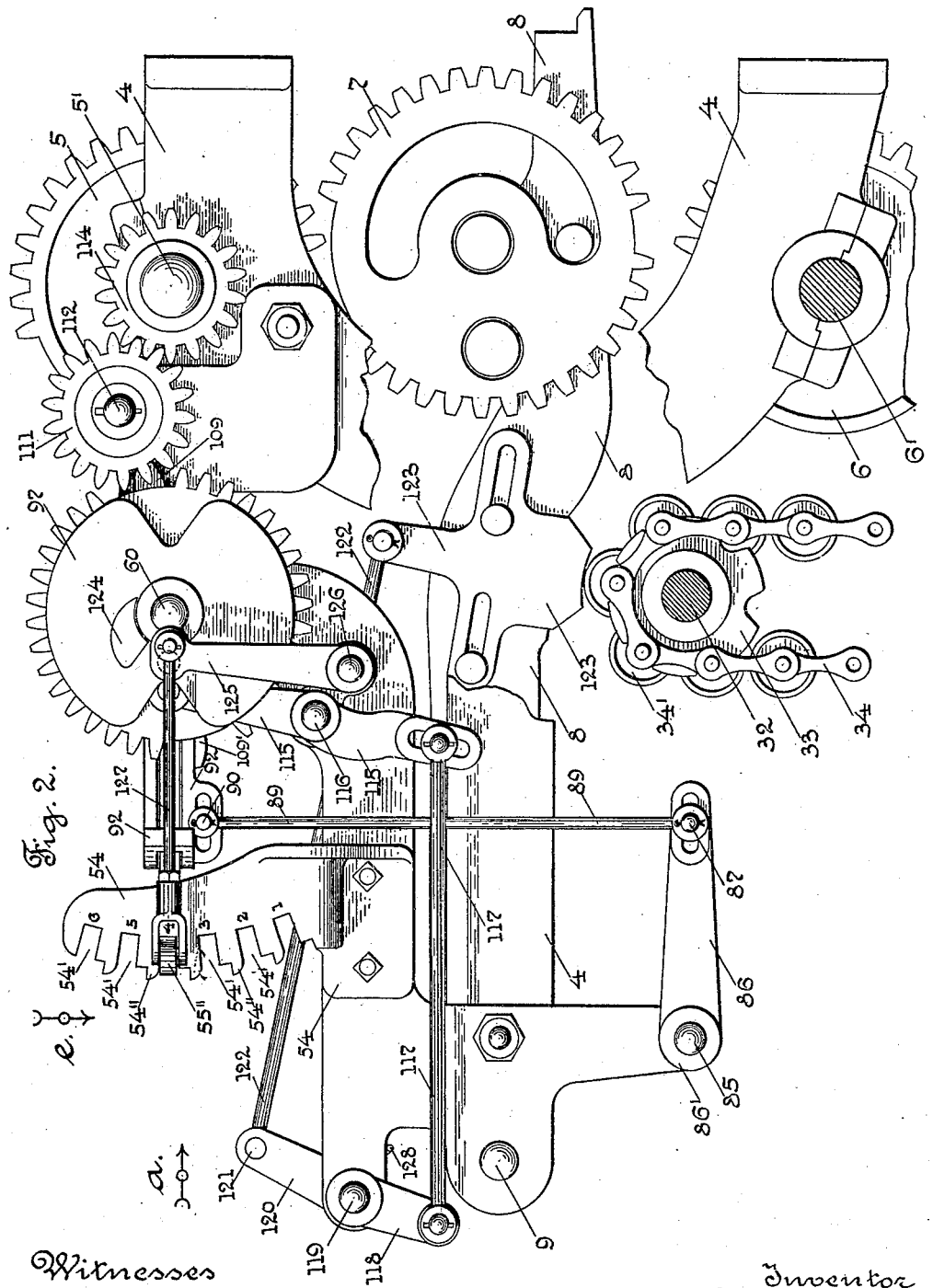

E. H. RYON.
WEFT REPLENISHING LOOM.
APPLICATION FILED FEB. 23, 1907.
935,693.
Patented Oct. 5, 1909.
9 SHEETS—SHEET 3.
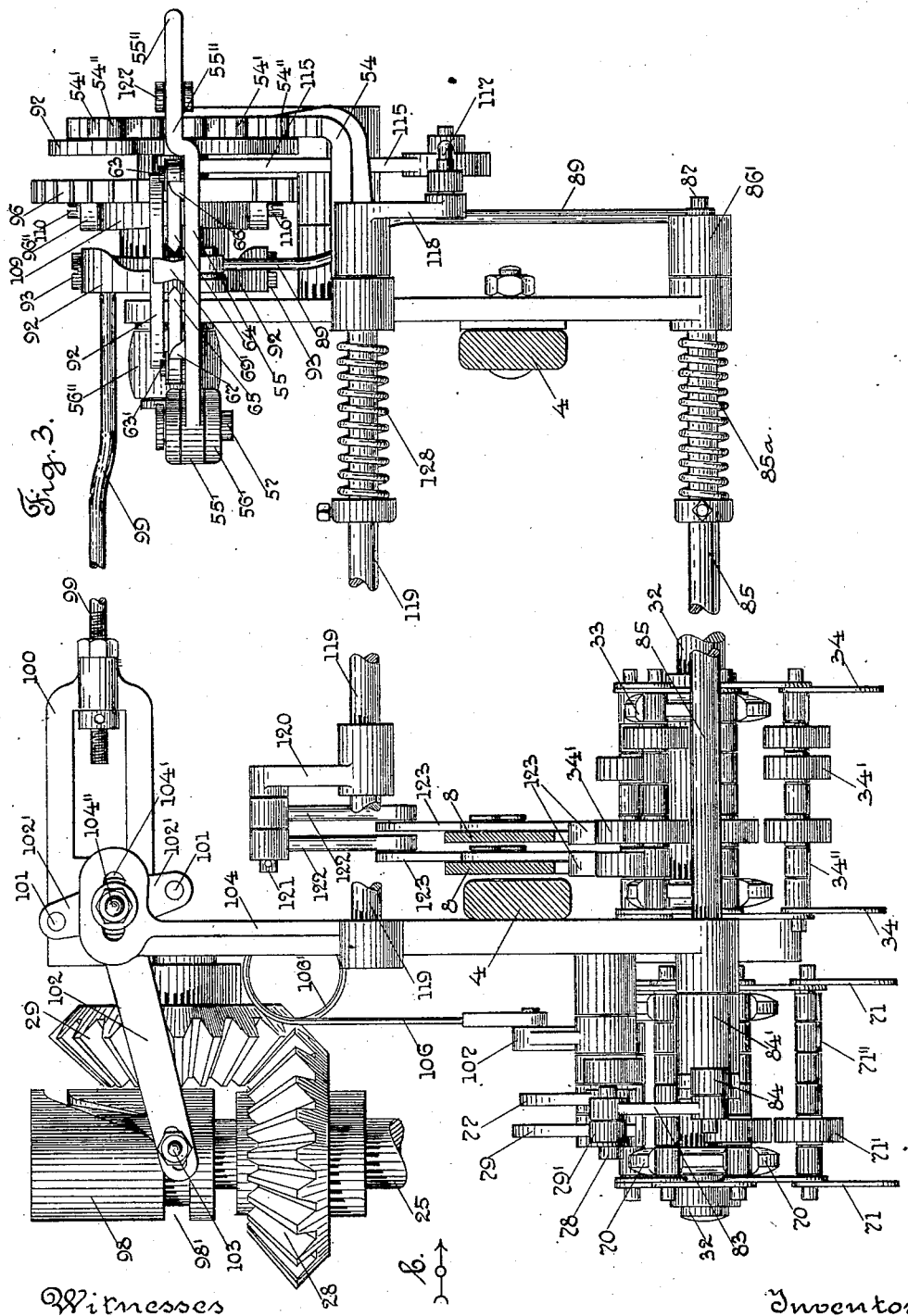
Witnesses
W. Bredt.
W. Haas.
Inventor
Eppa H. Ryon.
By John E. Dewey
Attorney.

E. H. RYON.
WEFT REPLENISHING LOOM.
APPLICATION FILED FEB. 23, 1907.
935,693.
Patented Oct. 5, 1909.
9 SHEETS—SHEET 4.
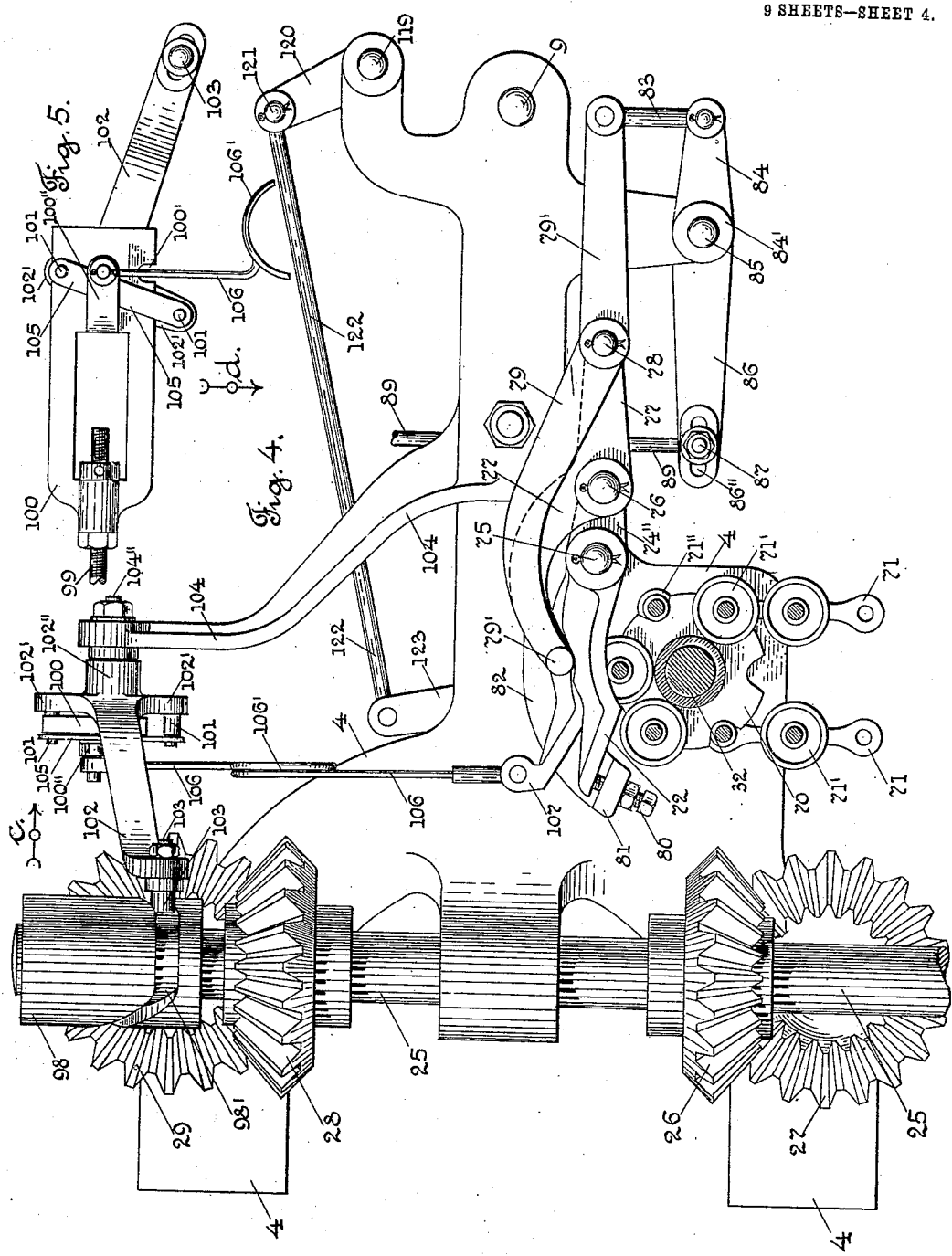
Witnesses
M. Bredt.
M. Haas.
Inventor
Eppa H. Ryon.
By John C. Dewey
Attorney.

E. H. RYON.
WEFT REPLENISHING LOOM.
APPLICATION FILED FEB. 23, 1907.

935,693.

Patented Oct. 5, 1909.
9 SHEETS—SHEET 5.

Witnesses
M. Bredt.
M. Haas.

Inventor
Eppa H. Ryon.
By John C. Dewey
Attorney.

E. H. RYON.
WEFT REPLENISHING LOOM.
APPLICATION FILED FEB. 23, 1907.
935,693.
Patented Oct. 5, 1909.
9 SHEETS—SHEET 6.
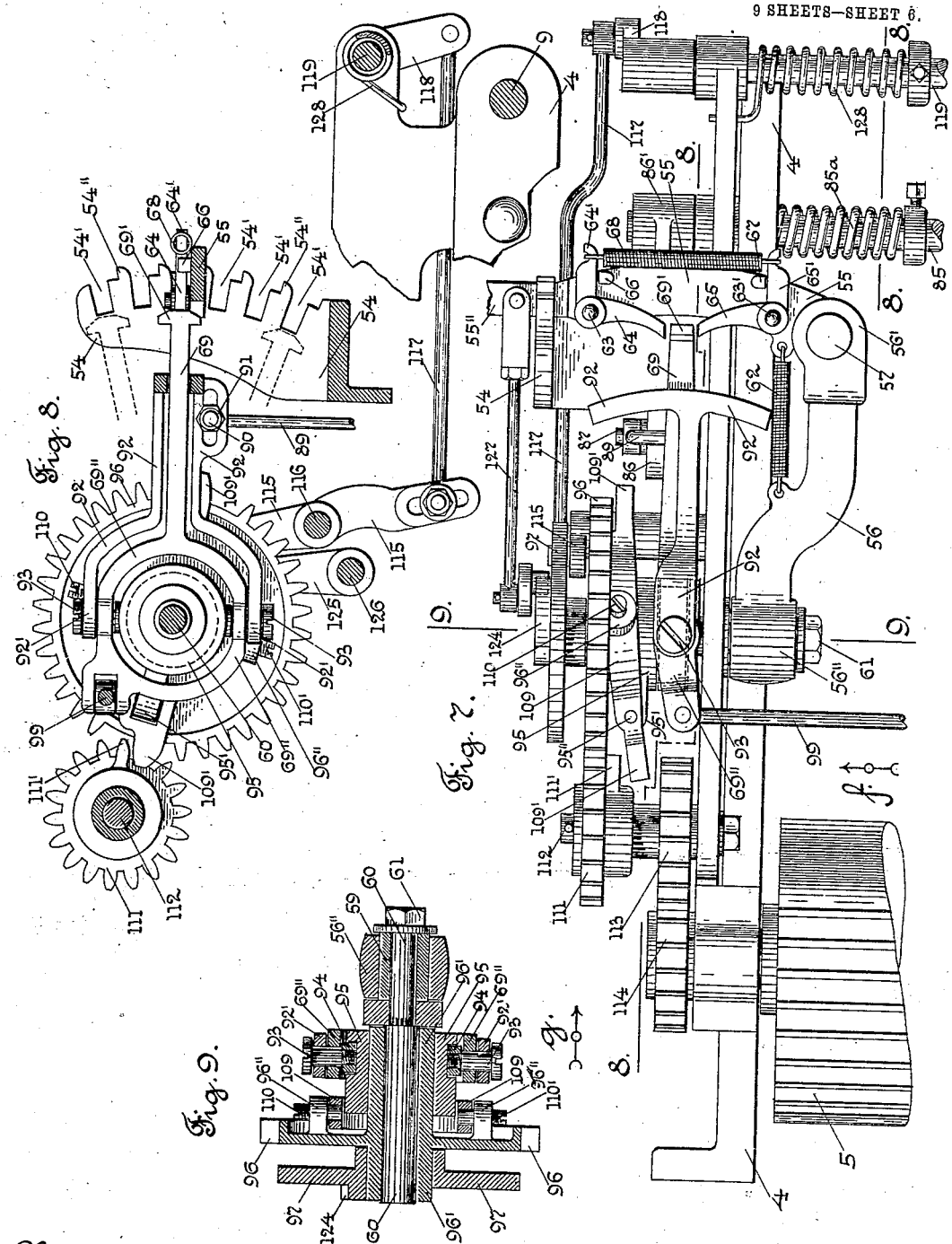
Witnesses
M. Bredt.
M. Haas.
Inventor
Eppa H. Ryon.
By John C. Dewey.
Attorney.

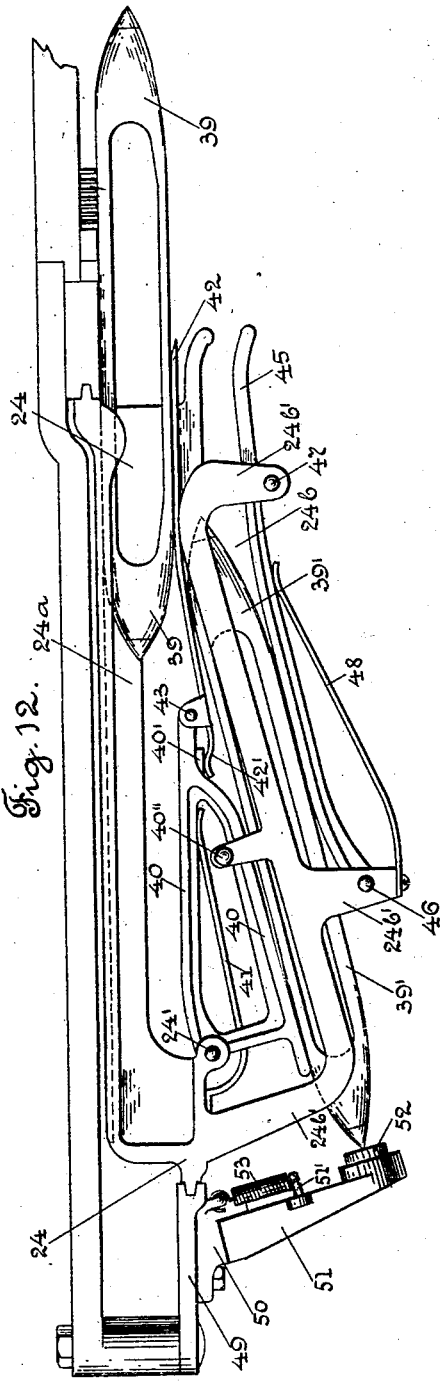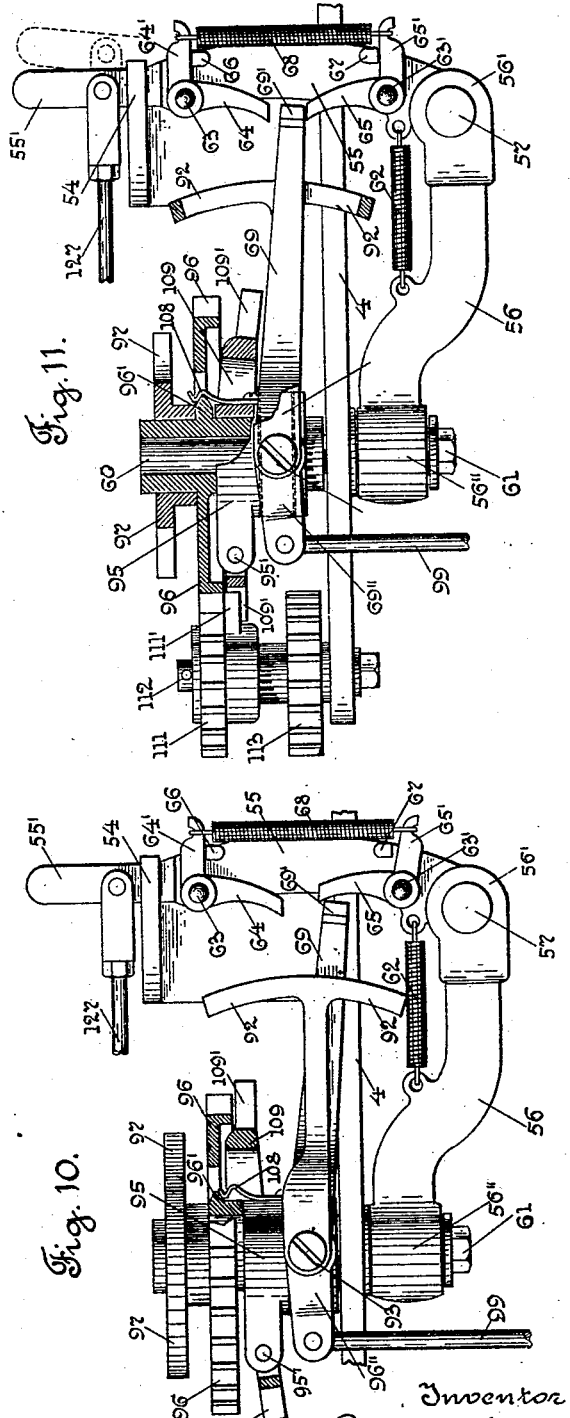

E. H. RYON.
WEFT REPLENISHING LOOM.
APPLICATION FILED FEB. 23, 1907.
935,693.
Patented Oct. 5, 1909.
9 SHEETS—SHEET 8.
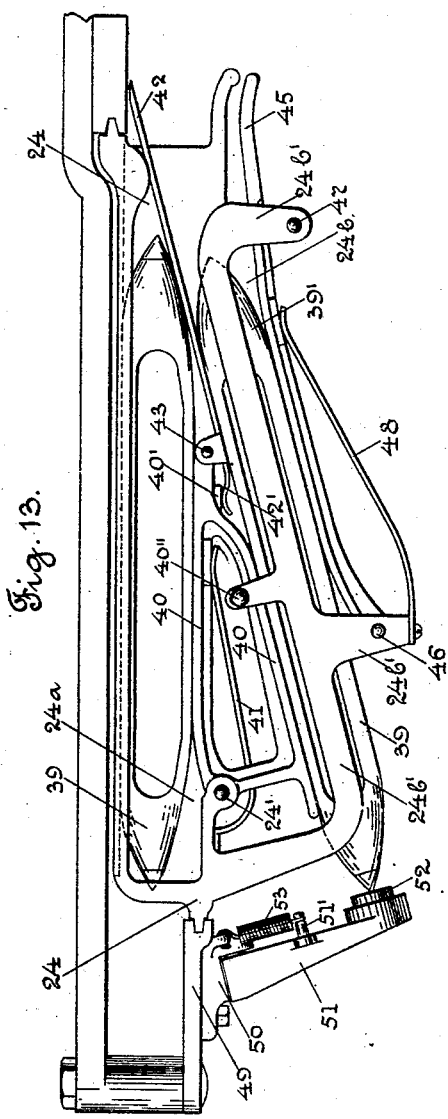
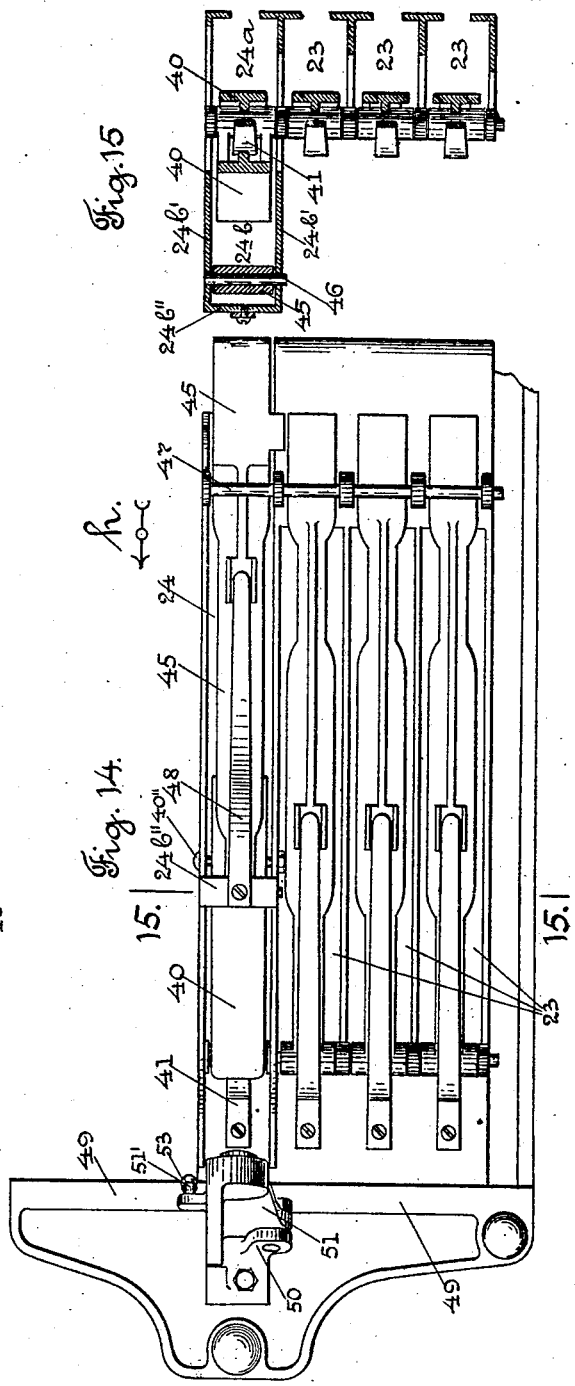

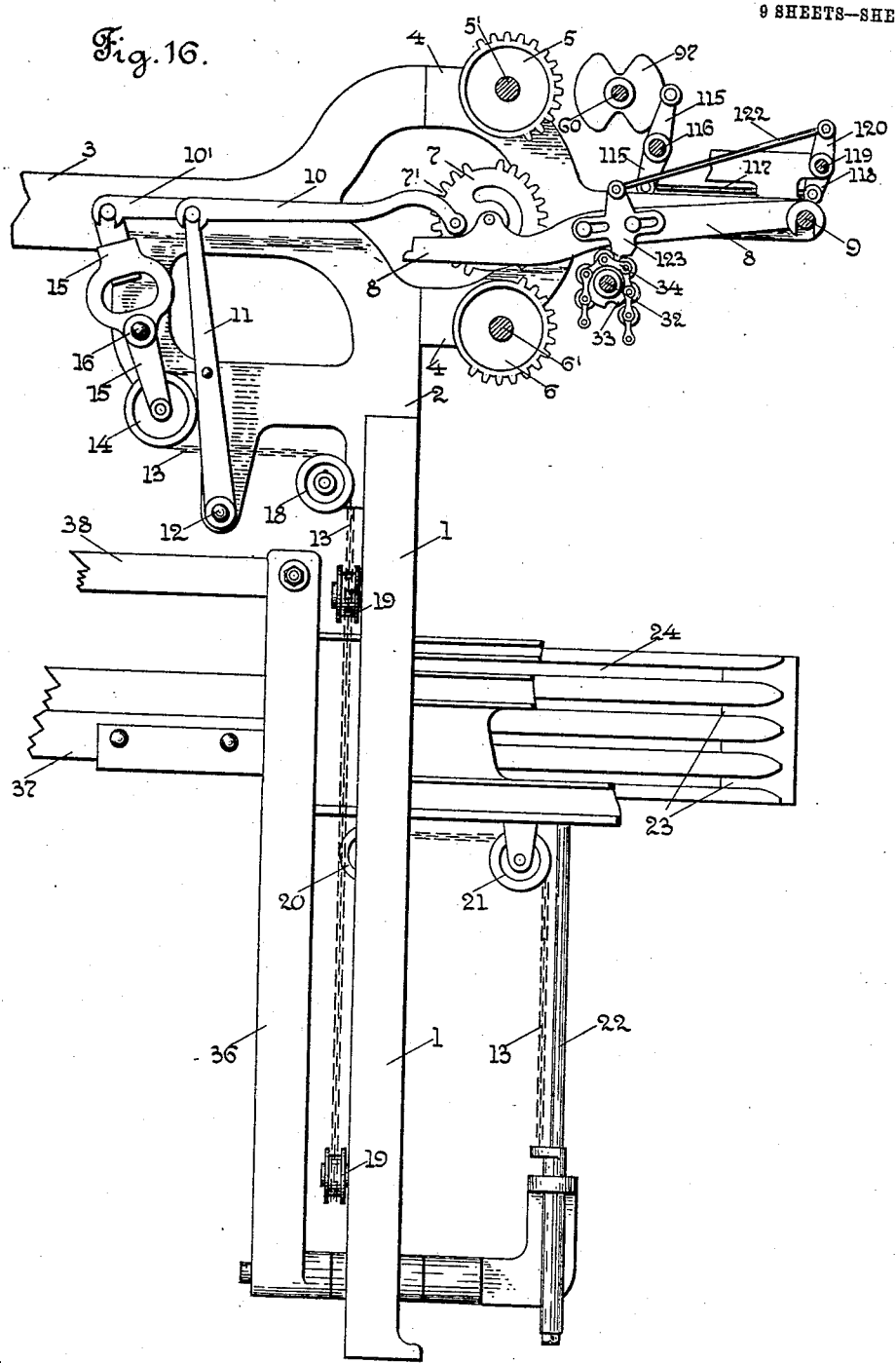

UNITED STATES PATENT OFFICE.

EPPA H. RYON, OF WORCESTER, MASSACHUSETTS, ASSIGNOR TO CROMPTON & KNOWLES LOOM WORKS, A CORPORATION OF MASSACHUSETTS.

WEFT-REPLENISHING LOOM.

935,693.  Specification of Letters Patent.  Patented Oct. 5, 1909.

Application filed February 23, 1907. Serial No. 358,847.

*To all whom it may concern:*

Be it known that I, EPPA H. RYON, a citizen of the United States, residing at Worcester, in the county of Worcester and State of Massachusetts, have invented certain new and useful Improvements in Weft-Replenishing Looms, of which the following is a specification.

My invention relates to looms, and to that class of looms termed fancy looms, which have a plurality of drop or change shuttle-boxes at one or both ends of the loom, for shuttles having filling therein of a different color or character, and having a Knowles head, so-termed, with a shuttle-box mechanism, comprising upper and lower cylinder gears, intermediate vibrator gears, vibrator levers, a box pattern surface for operating said levers, and connections to the shuttle-boxes for moving the same according to the indications of the pattern surface, as fully shown and described in U. S. Reissue Letters Patent, No. 7,784.

My invention particularly relates to shuttle changing mechanism, and to indicating mechanism operated by the weaver, and adapted to be combined with the ordinary Knowles head motion above referred to, and other parts of a loom of the class referred to, of ordinary construction, and by means of which any shuttle having its filling practically or substantially exhausted, may be automatically exchanged for a shuttle having a full supply of filling of the same color or character, without stopping the loom.

The object of my invention is to provide a shuttle changing mechanism, and an indicating mechanism, of simple construction and operation, to be combined with looms of the class referred to, having a Knowles head motion, and by means of which the weaver, when he sees the filling in any of the shuttles is practically exhausted, through the manual operation of the indicating mechanism, which is preferably located on the head of the loom, at the front thereof, puts into operation the mechanism for changing a shuttle having the practically exhausted filling, for a shuttle having a full supply of filling of the same color or character, without stopping the loom.

In connection with my improvements, I preferably use a double, or what I term a "switch shuttle-box", having two cells in the same horizontal plane, one cell for the spare shuttle, which is placed in said cell by the weaver, and the other cell to receive the shuttle to be exchanged.

The switch shuttle box is preferably located over the ordinary working shuttle boxes, one or more in number, and is movable up and down therewith, and in the normal operation of the loom only the working shuttle boxes are moved into alinement with the race-way.

My invention consists in certain novel features of construction of my improvements as will be hereinafter fully described.

I have only shown in the drawings detached parts of a loom of the class referred to, having a Knowles head motion, and my improvements combined therewith.

In the construction of my improvements shown in the drawings, I have seven ordinary working shuttle-boxes, four on the right hand end of the loom, not shown, and three on the left hand end, in which six working shuttles may be used. In case it is desired to use more than six working shuttles, it is only necessary to increase the number of shuttle-boxes on each end of the loom. I have combined my switch shuttle-box with the three ordinary boxes on the left hand end of the loom.

Referring to the drawings:—Figure 1 is a front view of the left hand end of a loom of the class above referred to, showing parts of the Knowles head motion, and my improvements combined therewith, and three drop shuttle-boxes, with my switch shuttle-box combined therewith. Fig. 2 shows, on an enlarged scale, the parts shown at the upper part of Fig. 1, with some of the parts broken away, and other parts left off, to more clearly illustrate the construction of my improvements. Fig. 3 is a sectional end view of the parts shown in Fig. 2, broken out through the central portion, and looking in the direction of arrow $a$, same figure; the cylinder gears are not shown in this figure. Fig. 4 is an end view of the parts shown in Fig. 3, looking in the direction of arrow $b$, same figure. This figure shows the upright driving shaft extended, and additional bevel gears. Fig. 5 is a detached view of the operating lever shown in Fig. 4, looking in the direction of arrow c, same figure. Fig. 6 is a plan view of the parts shown in Fig. 4, looking in the direction of arrow d, same figure. Fig. 7 is a plan view, looking from the rear of the loom, of the parts shown in Fig. 2, looking in the direction of arrow e, same figure. Fig. 8 is a section, on line 8, 8, Fig. 7, looking in the direction of arrow f, same figure. Fig. 9 is a section, on line 9, 9, Fig. 7, looking in the direction of arrow g, same figure. Fig. 10 shows the indicating levers shown in Fig. 7, in a different position; some parts are left off in this figure, and some parts are shown in section. Fig. 11 corresponds to Fig. 10, but shows some of the parts in another position, and some of the parts in section. Fig. 12 is a plan view of my switch shuttle-box, showing the spare shuttle being picked. Fig. 13 corresponds to Fig. 12, but shows the spare shuttle before it is picked. Fig. 14 is a front view of the shuttle-boxes, shown in Fig. 1. Fig. 15 is a section through the shuttle-boxes, on line 15, 15, Fig. 14, looking in the direction of arrow h, same figure, the box guide frame, and other parts are not shown in this figure. Fig. 16 is a rear view of the end of the loom shown in Fig. 1, showing the connections to the shuttle-boxes, and the sliding run on the vibrator lever; some of the parts are not shown in this figure, and some parts are broken away and shown in section. Figs. 2 to 15 inclusive are shown on an enlarged scale.

In the accompanying drawings, 1 is the loom side or end frame, 2 the arch stand, 3 the arch, 4 the head frame, having thereon the head motion of the well known Knowles type, above referred to, and comprising the upper cylinder gear 5, the lower cylinder gear 6, the intermediate vibrator gear 7 carried on the vibrator lever 8, pivotally mounted on its outer end on a transverse rod 9. The vibrator gear 7 is connected, through the vibrator connector 10 to the lever 11 of the box motion, which lever is pivotally mounted at its lower end on a stud 12, and has one end of a chain 13 attached thereto, which passes over the pulley 14 on a second lever 15 pivoted on a stud 16, and connected through a vibrator connector 10′ with a second vibrator gear 7′. The chain 13 passes over a guide sheave 18, see Fig. 16, and over guide sheaves 19, 20, and 21, to the vertically moving shuttle-box rod 22, carrying in this instance the three ordinary drop or change shuttle-boxes 23, and my switch shuttle-box 24, see Fig. 1.

The head motion is operated through the upright driven shaft 25, see Fig. 4, which is mounted in suitable bearings and has thereon a bevel gear 26, meshing with and driving a bevel gear 27 fast on the shaft 6′ of the lower cylinder gear 6, and also having fast thereon the bevel gear 28, meshing with the bevel gear 29 fast on the shaft 5′ of the upper cylinder gear 5. A pinion 30 on the lower cylinder shaft 6′ meshes with and drives a gear 31, fast on the pattern chain cylinder shaft 32 carrying the box pattern chain cylinder 33, with the box pattern chain 34 thereon, see Fig. 2. The chain 34 is in this instance made of links, and bars carrying rolls 34′ and tubes 34″, in the usual way. 35 is the breast beam, 36 the lay sword, pivotally mounted at its lower end, 37 the lay beam, and 38 the hand rail.

All of the above mentioned parts, except the switch shuttle box, may be of the usual and well known construction.

It will be understood that on the opposite end of the loom, not shown, there are in this instance four drop or change shuttle-boxes of ordinary construction, which are connected with the box operating mechanism of the head motion in the usual way.

I will now describe my improvements.

I will first describe my switch shuttle-box, so-termed, which in this instance is located at the head motion end of the loom, above the three ordinary shuttle-boxes, and forming a part thereof and moving therewith.

The switch shuttle-box 24, see Figs. 12, 13, 14, and 15, comprises a shuttle-box or cell 24$^a$ in vertical alinement with the three ordinary shuttle-boxes. This box or cell is for the spare shuttle 39, which is placed therein by the weaver, through the open top of the box. The shuttle-box 24$^a$ is provided with a specially shaped shuttle binder 40, pivoted at the outer end of the box on a pin 24′, and acted on by a spring 41 to bear against the spare shuttle 39, see Fig. 13. On the front of the spare shuttle box or cell 24$^a$ is an extension, comprising two parallel plates 24$^{b\prime}$, see Fig. 15, in the same horizontal plane as the top and bottom plates of the box or cell 24$^a$, and forming the top and bottom of a shuttle-box or cell 24$^b$. The outer edge or side of the shuttle binder 40 forms the inner wall of the box or cell 24$^b$, at its outer end, and the inner end of the inner wall of the box or cell 24$^b$ is formed, in this instance, by a spring blade or plate 42, which is pivotally mounted at its outer end on a stud or pin 43, on the inner end of the binder 40. The spring blade 42 has a rearward extension 42′ thereon, which is adapted to engage in this instance a projection 40′ on the binder 40, and acts to normally hold the spring blade 42 in an inclined position, shown in Fig. 13, and in connection with the binder 40 forms the inner wall and guide for the shuttle 39′, to be exchanged. At the front of the box or cell 24$^b$ is the binder 45, pivoted at its outer end on the pin 46 on an extension on the plates 24$^{b\prime}$. The inner end of the binder 45 extends back of a pin 47, on an extension on the plates 24$^{b\prime}$. A spring 48 is secured at its outer end, and bears at its inner end against the binder 45, and acts to move the binder against the shuttle 39'. The binder 45 forms the outer wall of the shuttle box or cell 24ᵇ.

On the outer guide frame 49, of the shuttle-boxes 23, is fast a stand 50, which in this instance has hinged thereto the inner end of an arm 51, having a leather or other yielding cushion surface 52 on its outer end in the path of the outer end of the shuttle 39', and to be engaged by the outer end of said shuttle, and act as a stop therefor, when the shuttle to be exchanged is picked from the other end of the lay into the box or cell 24ᵇ.

A helically coiled tension spring 53 is attached at one end to the stand 50, and at its other end to a stud 51' on the arm 51, and acts to hold the arm 51 in its upward position. To remove the shuttle 39' from the box or cell 24ᵇ of the switch shuttle-box, the arm 51 may be moved downwardly to release the shuttle and allow it to be withdrawn from the box by the weaver.

The switch shuttle-box has the cell 24ᵇ to receive the shuttle to be exchanged, and the cell 24ᵃ to hold the spare shuttle, which takes the place of the shuttle to be exchanged.

In the normal operation of the loom shown in the drawings, with four ordinary drop shuttle-boxes at one end, not shown, and three ordinary shuttle-boxes at the other end, six shuttles are used, one for each shuttle-box, and one box empty. Each shuttle has its own box, and the shuttles may be numbered 1, 2, 3, 4, 5, and 6, corresponding to the boxes 1, 2, 3, 4, 5, and 6. In case the filling of any one of the six shuttles becomes practically or substantially exhausted, the weaver takes a new shuttle, having a filling of the same character or color as the filling which is practically or substantially exhausted, and places it in the spare shuttle cell or box 24ᵃ of the switch shuttle-box; he then operates the indicating mechanism of the shuttle changing mechanism to be hereinafter described, and when the shuttle having the substantially exhausted filling is on a line with the race-way at one end of the loom, the switch shuttle-box will be on a line with the race-way on the other end of the loom, ready to receive the shuttle to be exchanged in the box or cell 24ᵇ of the switch shuttle-box, and at the proper time, according to the call of the box pattern chain, the spare shuttle 39 in the inner cell of the switch shuttle-box will be picked, as will be hereinafter fully described.

I will now describe my improvements in indicating mechanism to put into operation the shuttle changing mechanism, and also describe my improvements in shuttle changing mechanism.

My indicating mechanism, which is manually operated by the weaver, is preferably located at the front of the head motion, at the outer end thereof. There is in this instance an upright stand 54, see Fig. 2, secured to the head frame, or some stationary part of the loom, which has a series of notches 54' in one edge thereof, in this instance the outer edge, said notches being six in number, corresponding to the number of shuttles in use in the loom, said shuttles preferably carrying filling of different color or character. There are also a series of rests or lips 54" on the plate 54.

In connection with the upright notched stand 54 is used a lever 55, having a hub 55' thereon extending between the forked shaped end 56' on an arm 56, and pivotally mounted thereon by a bolt 57, see Fig. 3, and having an engaging end 55" at the front of the loom, to be manually operated by the weaver, and to be removed from any one of the rests or notches 54" on the stand 54, and placed in any one of the notches 54', according as it is desired to change a shuttle numbered correspondingly to a numbered notch 54' on the upright stand 54. The arm 56 has a hub 56" thereon, see Fig. 7, which is pivotally mounted on a bushing 59, see Fig. 9. The bushing 59 is mounted on the reduced end of a stud 60, which is supported in a stationary part of the head frame and is secured therein by a nut 61, see Fig. 9.

The lever 55 has attached thereto one end of a spiral tension spring 62, the other end of said spring is attached to the arm 56, see Fig. 11. The spring 62 acts to yieldingly hold the engaging end 55' of the lever 55 in a notch 54' of the stand 54, in which it is placed. On the lever 55, on two studs 63 and 63', are pivotally mounted two latches 64 and 65, see Fig. 7. Each of the latches 64 and 65 has an extension 64' and 65' thereon, each of which is adapted to engage a projection 66 and 67, respectively, on the lever 55, to limit the pivotal movement in one direction of said latches. A helically coiled tension spring 68 is attached at one end to one latch 64, and at its other end to the other latch 65, and is adapted to draw the latches toward each other, to hold the extensions thereon against the stops 66 and 67, see Fig. 7.

The object of the latches 64 and 65 is to stop the movement of the vibrator lever 69, when the offset end 69' on said lever 69 comes between said latches 64 and 65, and causes the starting of the shuttle changing mechanism.

The pattern chain cylinder shaft 32 has a second pattern chain cylinder 70 thereon, carrying a pattern chain 71, made up of links, and bars carrying rolls 71' and tubes 71", see Figs. 3, 4, and 6. The pattern chain 71 operates a compound lever mechanism.

There are in this instance three pattern indicator levers 72, 73, and 74, see Fig. 6, extending over the pattern chain 71, and provided with hubs 72', 73', and 74', respectively, each loosely mounted on a stationary stud 75 secured to the loom frame. The hub 74' of the lever 74 has an extension 74" thereon, which is pivotally connected, through a stud or pin 76, with a lever 77. The lever 77 has a rounded extension 77' on one end, which extends over and rests in a recess in the upper edge of the lever 73, and said lever 77 carries a stud 78 at its other end, the outer end, on which is pivotally mounted a lever 79. The lever 79 has a rounded extension 79' on one end, which extends over and rests in a recess in the upper edge of the pattern lever 72, see Fig. 4. Adjusting screws 80, see Fig. 4, in a bar 81 on a stationary arm 82 secured to the loom frame, may be used for regulating the downward movement of the pattern levers 72, 73, and 74, if desired.

The levers 74, 77, and 79, with the pattern levers 72 and 73, form a compound lever, and cause seven different positions of the outwardly extending arm 79' on the lever 79. In the present instance there are only six shuttles, and only six positions are necessary.

The outwardly extending arm 79' on the lever 79 is connected through a link 83 with an arm 84, the hub 84' of which is fast on one end of a rock shaft 85, see Fig. 6, mounted in suitable bearings on the frame. A helically coiled spring 85ª, attached at one end to the rock shaft 85, and at its other end to a stationary part of the frame, see Fig. 6, acts to rotate said shaft 85, and return it to its normal position. On the opposite end of the rock shaft 85 is fast the hub 86' of an arm 86, see Fig. 6. The arm 86 has an elongated opening 86" therein, see Fig. 4, to which is adjustably attached, by a bolt 87 and nut 88, the lower end of a connector 89. The upper end of the connector 89 is adjustably attached by a bolt 90 and nut 91, see Fig. 8, to a guiding segment 92, for the vibrator lever 69.

The vertical movement of the guiding segment 92, according to the indications of the pattern chain 71, and the movement of the compound lever mechanism, above described, causes a similar vertical movement of the vibrator lever 69, to bring it between the latches 64 and 65 on the indicating lever 55, according to the position of said indicating lever relative to the notches 54' in the upright stand 54.

The vibrating lever 69 is adapted to have a vibrating motion, and also a rocking motion in a vertical plane, and in this instance has at its inner end a ring shaped formation 69", see Fig. 8, which is pivotally connected by screws 93 with a ring 94, see Fig. 9, extending loosely in an annular groove in a collar 95, which is loosely mounted on the extended hub 96', of a mutilated gear 96. The hub 96' of the mutilated gear 96 is loosely mounted on the stationary pin 60, see Fig. 11. The mutilated gear 96 has also fast upon its extended hub 96', see Fig. 9, a cam 97. The guiding segment 92 has a forked shaped attached end 92', see Fig. 8, which extends upon the outside of the circular end 69" of the vibrator lever 69, and is also attached to the ring 94 by the screws 93, see Fig. 9.

The vibrator lever 69 has an oscillating movement communicated thereto, in this instance by a cam 98, see Fig. 4, fast on the upright driven shaft 25, through connections to be hereinafter described.

The ring shaped end 69" of the vibrating lever 69 has one end of a connector or rod 99, see Fig. 7, pivotally connected thereto; the other end of said rod or connector 99 is adjustably connected, in this instance with a plate 100, see Fig. 3. The plate 100 has a recess 100' in its opposite edges, see Fig. 5, and extends between two studs or pins 101, on oppositely extending projections 102' on the lever 102, see Fig. 4; the hub 102" of which is loosely mounted on a bolt or stud 104" which is adjustably secured in an elongated opening 104' in the upper end of a stationary stand 104 secured to the frame, see Figs. 3 and 4. A plate or bar 105, see Figs. 4 and 5, is secured to the studs or pins 101, and holds the plate 100 in proper position. The lever 102 has a stud 103 adjustably secured on the end thereof, which stud extends into the cam groove 98' in the cam 98, fast on the shaft 25, and through the revolution of said cam 98 an oscillating movement is communicated to the lever 102.

An ear or lug 100", see Fig. 5, on the plate 100, is connected by a wire 106, having in this instance a coil 106' therein, with a pattern indicator lever 107, see Figs. 4 and 6, which extends over the pattern chain 71, and has its hub 107' loosely mounted on the stud 75, see Fig. 6.

The movement of the pattern finger or indicator lever 107, through the wire 106, raises and lowers the plate 100, to cause the recess 100', in its upper edge, to engage with the upper pin 101, or the recess 100' in its lower edge to engage with the lower pin 101, in the rocking cam lever 102, to move said plate 100, and through the connector 99, to oscillate the vibrating lever 69 in one direction or the other.

When the vibrating lever 69 extends between the latches 64 and 65, so that the oscillating movement of said lever is prevented, the continued revolution of the cam 98, through connections to the vibrating lever 69, moves the collar 95 on the extended hub 96' of the mutilated gear 96, toward the mutilated gear 96, from the position shown in Fig. 10, to the position shown in Fig. 11.

A small leaf spring 108, attached to the collar 95, is adapted to engage a projection on the hub 96' of the mutilated gear 96, as shown in Fig. 11, and yieldingly hold the collar 95. The collar 95 has an extension or arm 95' thereon, which is connected by a pin 95'', see Fig. 7, with a lever 109, which is of ring shape at its central portion, and oscillates on two screws 110 and 110', secured in lugs or ears 96'' on the mutilated gear 96, see Fig. 9. The extended ends 109' of the lever 109 form starting teeth to be moved into the path of a projection 111' on the mutilated pinion 111, so that the revolution of said pinion 111 will cause the revolution of the mutilated gear 96. The mutilated pinion 111 is loosely mounted on a stud 112, see Fig. 7, secured to the frame, and has attached thereto a second pinion 113, which meshes with and is driven by a pinion 114 fast on the upper cylinder gear shaft of the head motion.

The rotation of the mutilated pinion 96, when one end 109' of the oscillating lever 109 is moved into the path of the mutilated pinion 111, on the stopping of the oscillating movement of the vibrating lever 69, will cause the rotation of the cam 97. The rotation of the cam 97 will move a cam lever 115, see Figs. 2 and 16, which lever is centrally pivoted on a stud 116, and connected by a link 117 with an arm 118 fast on a rock shaft 119, mounted in suitable bearings. Also fast on the rock shaft 119 is a second arm 120, carrying a stud 121 thereon, see Fig. 3, on which is loosely mounted the hubs of two links or connectors 122 to the two sliding runs 123, one on each vibrator lever 8. Through the rotation of the cam 97, and the connections to the sliding runs 123, the runs are moved on the vibrator levers 8, away from the pattern indications on the box pattern chain 34, and cause, through connections to the shuttle-boxes 23, the switch shuttle-box 24 to move to the line of the race-way of the lay, to receive, in the outer cell 24$^b$, the shuttle to be exchanged, and at the proper time, have the new shuttle picked from the inner cell 24$^a$ of the swivel shuttle-box 24, see Fig. 12.

By the revolution of the cam 97, a small cam 124, see Fig. 2, is caused to engage the upper end of a lever 125, pivoted on a stud 126, and through link or connector 127, attached to the lever 125 and to the lever 55, move the engaging end 55' of said lever outwardly, as indicated by broken lines in Fig. 11, and cause it to move out of a notch 54' in the plate 54, and drop onto a rest or lip 54'', its normal position, and thus move the latches 64 and 65, on the lever 55, out of the path of the vibrating lever 69, to leave said lever free to oscillate, until another shuttle changing operation is required.

A helically coiled spring 128 attached at one end to the shaft 119, and at its other end to a stationary part of the frame, see Fig. 3, acts to rotate said shaft 119, and to return the runs 123 to their normal position over the pattern chain 34.

From the above description in connection with the drawings, the operation of my improvements will be readily understood by those skilled in the art and briefly is as follows:—When the filling becomes nearly exhausted in anyone of the shuttles, of which there may be six, the weaver places a shuttle in the spare shuttle cell 24$^a$ of the switch shuttle box 24, having filling therein corresponding to the filling which is nearly exhausted. He then takes the engaging end 55' of the lever 55 of the indicating mechanism, and removes the end 55' from the rest or notch 54'', in the plate 54, in which it is, and places it in one of the notches 54' in the plate 54; the numbered notch which corresponds with the number of the shuttle to be exchanged, for example No. 4. The indicating chain on the pattern chain cylinder 70 is built in such a way, that through the compound levers and connections to the oscillating lever 69, the said lever is caused to move up and down, from alinement with one of the notches 54' in the plate 54, to one of the other notches 54', according to the shuttle that is being picked. For instance, when the shuttle which may be known as No. 1 is being picked, the oscillating lever 69 will be opposite the notch No. 1 in the stand 54. When No. 2 shuttle is being picked, the oscillating lever 69 will be opposite No. 2 notch in the stand 54, and so on throughout the six positions. After each successive rise or fall of the oscillating lever 69, through the indicating chain and connections, the oscillating lever 69 is given an oscillating motion horizontally, through the cam 98 and intermediate connections.

When in the normal operation of the loom the end of the oscillating lever 69 comes in alinement with the notch 54', in which the weaver has placed the lever handle 55'', the starting tooth or lever 109 will be swung in the path of the starting tooth of the mutilated pinion 111, and the first operation takes place, which consists, through the rotating cam 97 and intermediate connections, in lowering the switch shuttle box 24 to the line of the raceway to receive the spent shuttle. This first operation will require a half rotation of the cam 97. The handle 55'' will still remain in the notch 54', and the operation of starting the cam 97 for the second half of its rotation, will be begun when the end of the oscillating lever 69 is raised or lowered to the level of the notch 54' in which the weaver has placed the lever handle 55".

When the second operation has been completed, which consists in the cam 97 being turned the other half revolution, the operation is completed, and the new shuttle is thrown into the shed, and the cam 124 pushes the lever handle 55" out of the notch 54' in which it has been placed, on to the rest or lip 54".

It will be understood that the details of construction of my improvements may be varied if desired.

Having thus described my invention, what I claim as new and desire to secure by Letters Patent is:

1. In a change shuttle loom, movable shuttle boxes, comprising a switch shuttle box with two cells in the same horizontal plane, one cell for the spare shuttle to be placed therein by the weaver, and the other cell for the spent shuttle to be removed by the weaver, and a working shuttle box in a different horizontal plane.

2. In a change shuttle loom, movable shuttle boxes, comprising a switch shuttle box, with two cells having their inner ends in the same horizontal plane, one cell for the spare shuttle to be placed therein by the weaver, and the other cell for the spent shuttle to be removed by the weaver, and a working shuttle box in a different horizontal plane.

3. In a loom of the class described, movable shuttle boxes, having a shuttle box with a cell to receive the shuttle to be exchanged and a cell for the spare shuttle, in the same horizontal plane, and a working shuttle box in a different horizontal plane.

4. In a loom of the class described, movable shuttle boxes, having a shuttle box with a cell to receive the shuttle to be exchanged, and a cell for the spare shuttle, said last named cell having its entrance in the same horizontal plane as the first named cell, and a working shuttle box in a different horizontal plane.

5. In a loom of the class described, movable shuttle boxes, having a shuttle box with a cell to receive the shuttle to be exchanged, and a cell for the spare shuttle, having its entrance in the same horizontal plane as the first named cell, and a working shuttle box in a different horizontal plane, and means to bring said cells in position to receive the spent shuttle and have the new shuttle picked, and to remove said cells from operative position and bring said working cell into operation.

6. In a loom of the class described, runs on the vibrator levers of the box motion, and said levers, a mutilated gear, a cam attached thereto, connections from said runs to said cam, a pinon, means to rotate said pinion, and means to connect said pinion with said mutilated gear, to rotate said cam and move said sliding runs.

7. In a loom of the class described, a harness vibrator lever, a movable run thereon, a shuttle box having a cell to receive the spent shuttle, and a cell to receive the spare shuttle, both cells having their inner ends in the same horizontal plane, and means to move said run from engagement with the pattern chain, to bring said shuttle box in position to receive the spent shuttle and have the new shuttle picked.

8. In a loom of the class described, a manually operated indicator, means to retain said indicator in a position corresponding to the shuttle to be exchanged, an oscillating indicating lever, means to move the same, and automatic means to cause the coöperation of said oscillating lever with said manually operated indicator, to put into operation mechanism to operate the shuttle boxes and to bring into position the desired shuttle box.

9. In a loom of the class described, a manually operated indicator, means to retain said indicator in a position corresponding to the working shuttle, an indicator vibrating lever, means to vibrate the same, and automatic means to move said indicator into inoperative position.

10. In a loom of the class described, a manually operated indicator, means to retain said indicator in operative position, an indicator vibrating lever, and means to position said vibrating lever to correspond with the working shuttle, combined with means to cause the coöperation of said vibrating lever with said indicator.

11. In a loom of the class described, a manually operated indicator, means to retain said indicator in operative position, an indicator vibrating lever, and means, including a pattern chain, to position said vibrating lever to correspond with the working shuttle, combined with means to cause the coöperation of said vibrating lever with said indicator.

12. In a loom of the class described, movable shuttle boxes, comprising a working shuttle box for the normal operation of the loom, and a shuttle box having a plurality of cells, including a cell to receive a shuttle to be exchanged and a cell for the spent shuttle, and a binder for the shuttle to be exchanged, and a spring connected therewith, a second binder for the spent shuttle, and a spring connected with said binder for the spent shuttle.

13. In a loom of the class described, a mutilated gear, an arm having starting teeth pivoted thereon, a rotatable pinion having a starting tooth thereon, means to rotate said pinion, a manually operated indicator, an indicator vibrating lever, means to vibrate said lever, and connections between said lever and said arm, to cause the coöperation of the starting tooth on said pinion with a starting tooth on said arm.

14. In a loom of the class described, a shuttle box having a cell to receive a fresh shuttle to be exchanged, and a cell to receive a spent shuttle, a switch arranged between said cells, a binder for said spent shuttle cell, and connections between said binder and the protector rod, whereby the loom will be automatically stopped if the spent shuttle fails to properly enter said spent shuttle cell.

EPPA H. RYON.

Witnesses:
J. C. Dewey,
M. Haas.